United States Patent
Brekle

(10) Patent No.: US 7,748,403 B2
(45) Date of Patent: Jul. 6, 2010

(54) PRESSURE MAINTAINING VALVE, TOOL, SET AND FUEL INJECTION SYSTEM

(75) Inventor: Hans Brekle, Erdmannhausen (DE)

(73) Assignee: Robert Bosch GmbH, Stuttgart (DE)

( * ) Notice: Subject to any disclaimer, the term of this patent is extended or adjusted under 35 U.S.C. 154(b) by 1038 days.

(21) Appl. No.: 10/562,910

(22) PCT Filed: May 3, 2004

(86) PCT No.: PCT/DE2004/000930

§ 371 (c)(1),
(2), (4) Date: Mar. 29, 2006

(87) PCT Pub. No.: WO2005/010345

PCT Pub. Date: Feb. 3, 2005

(65) Prior Publication Data

US 2006/0236978 A1   Oct. 26, 2006

(30) Foreign Application Priority Data

Jul. 4, 2003   (DE) .............................. 103 30 132

(51) Int. Cl.
*F16F 15/00* (2006.01)
(52) U.S. Cl. .................................................. 137/512.3
(58) Field of Classification Search ................. 417/486, 417/487; 92/52, 53; 137/505.41, 504, 517, 137/460, 493.6, 493.2, 512.3, 522, 523; *F16K 15/00*
See application file for complete search history.

(56) References Cited

U.S. PATENT DOCUMENTS

| 5,542,827 A * | 8/1996 | Dombek et al. ............. 417/486 |
| 6,168,133 B1 | 1/2001 | Heinz et al. |
| 2002/0083980 A1* | 7/2002 | Nakajima et al. ...... 137/505.41 |

FOREIGN PATENT DOCUMENTS

| DE | 101 39 871 A1 | 2/2003 |
| DE | 103 39 250 A1 | 4/2004 |

* cited by examiner

*Primary Examiner*—Stephen K Cronin
*Assistant Examiner*—Keith Coleman
(74) *Attorney, Agent, or Firm*—Ronald E. Greigg

(57) ABSTRACT

A pressure-holding valve for a fuel injection system with a high-pressure region and a low-pressure region, the valve having with a valve housing having a first connection that can be connected to the low-pressure region and a second connection that can be connected to the return of a fuel injection valve device. The housing contains a reciprocating valve cup prestressed in opposition to the force of a first spring device and a through opening which can be closed by a closing element prestressed in opposition to the force of a second spring device to maintain a minimum pressure in the return. The valve housing, between the first connection and the valve cup includes with a pressure relief device that can be actuated from outside the housing.

20 Claims, 3 Drawing Sheets

PRESSURE MAINTAINING VALVE, TOOL, SET AND FUEL INJECTION SYSTEM

CROSS-REFERENCE TO RELATED APPLICATIONS

This application is a 35 USC 371 application of PCT/DE 2004/000930 filed on May 3, 2004.

BACKGROUND OF THE INVENTION

1. Field of the Invention

The present invention relates to a pressure-holding valve for a fuel injection system with a high-pressure region and a low-pressure region, which valve has a valve housing equipped with a first connection that can be connected to the low-pressure region and a second connection that can be connected to the return of a fuel injection valve device, which valve housing contains a reciprocating valve cup that is prestressed in opposition to the prestressing force of a first spring device and has a through opening, which can be closed by a closing element that is prestressed in opposition to the prestressing force of a second spring device in order to maintain a minimum pressure in the return. The present invention also relates to a tool for reducing the pressure in an above-described pressure-holding valve. The present invention also relates to a set including an above-described pressure-holding valve and an above-described tool. The present invention also relates to a fuel injection system that has a low-pressure region and a high-pressure region from which fuel is supplied to a fuel injection valve device that is connected to the low-pressure region via a return.

2. Description of the Prior Art

In conventional fuel injection systems, piezoelectric actuators can be used to assure a defined injection of fuel. Such a piezoelectric actuator can be coupled to a control valve element by means of a hydraulic coupling device. In order to assure a filling of the coupling device, a minimum pressure can be maintained in the return of the fuel injection valve device in the fuel injection system, even after the system itself or an associated internal combustion engine is switched off. This minimum pressure can be maintained by means of a pressure-holding valve in the return of the fuel injection valve device. The minimum pressure to be maintained by the pressure-holding valve can lead to an uncontrolled spraying of fuel during installation and/or maintenance work on the fuel injection system.

The object of the present invention is to provide a pressure-holding valve, a tool, a set, and/or a fuel injection system, which make it easily possible to selectively reduce the minimum pressure to be maintained by the pressure-holding valve.

SUMMARY AND ADVANTAGES OF THE INVENTION

In a pressure-holding valve for a fuel injection system with a high-pressure region and a low-pressure region, which valve has a valve housing equipped with a first connection that can be connected to the low-pressure region and a second connection that can be connected to the return of a fuel injection valve device, which valve housing contains a reciprocating valve cup that is prestressed in opposition to the prestressing force of a first spring device and has a through opening, which can be closed by a closing element that is prestressed in opposition to the prestressing force of a second spring device in order to maintain a minimum pressure in the return, the object is attained in that a pressure relief device that can be actuated from the outside is provided in the valve housing, between the first connection and the valve cup. The pressure relief device can be used to selectively reduce the pressure in the return with the aid of a tool. This reliably prevents an undesired spraying of the fuel. The spring devices are preferably helical compression springs that are supported at opposite ends of the valve housing.

A preferred exemplary embodiment of the pressure-holding valve is characterized in that the pressure relief device has a pressure pin that protrudes from the first connection toward the valve cup. The pressure pin serves to bridge over the distance between the first connection and the valve cup. It is, however, not necessary for the pressure pin to be in contact with the valve cup.

Another preferred exemplary embodiment of the pressure-holding valve is characterized in that the pressure pin protrudes from a positioning disk that is clamped between the second spring device and the valve housing. The positioning disk serves to position the pressure pin in the valve housing.

Another preferred exemplary embodiment of the pressure-holding valve is characterized in that between the positioning disk and the valve housing, there is a fixing disk that serves to fix a filter element between the positioning disk and the fixing disk. The contact pressure required to fix the filter element between the two disks is assured by the second spring device, which presses the fixing disk, the filter element, and the positioning disk against the valve housing. The resulting clamping prevents an undesired slippage of the filter element.

Another preferred exemplary embodiment of the pressure-holding valve is characterized in that through openings are provided in the fixing disk and the positioning disk. The through openings permit fuel to flow through from the first connection to the valve cup and vice versa.

Another preferred exemplary embodiment of the pressure-holding valve is characterized in that the through openings in the fixing disk and the positioning disk are designed and arranged so as to assure a flow of fuel through the fixing disk and the positioning disk regardless of a relative rotation of the two disks in relation to each other. A suitable size, number, and position of the through openings in the disks simplify assembly of the pressure-holding valve. The two disks can be offset from each other by any angle without hindering the passage of fuel.

Another preferred exemplary embodiment of the pressure-holding valve is characterized in that on the side oriented away from the positioning disk, the fixing disk has an annular bead at its radial outside. The annular bead functions as a spacer element and assures that the fixing disk does not rest directly against the opening of the first connection. This assures that the through flow of fuel from the first connection to the valve cup and vice versa is not hindered by the fixing disk itself.

With a tool for reducing the pressure in an above-described pressure-holding valve, the above-indicated object is attained in that the tool has a cup-shaped base body with a bottom from which an essentially circular, cylindrical circumferential wall extends, whose inner diameter is slightly greater than the outer circumference of the pressure-holding valve in the region of the first connection. When the fuel is bled from the valve housing, the tool is slid onto the first connection so that the circumferential surface of the cup partially encompasses the valve housing in order to catch the escaping fuel.

A preferred exemplary embodiment of the tool is characterized in that on the inside of the tool, an arbor extends from the bottom in the direction of the tool axis, whose outer diameter is slightly smaller than the inner diameter of the first connection and whose length is greater than the length of the first connection. The arbor, which is preferably oriented in the direction of the longitudinal axis of the valve housing, can be inserted through the first connection, which is preferably embodied in the form of a connection fitting, into the interior of the valve housing until it comes into contact with the fixing disk. If the arbor is inserted further into the interior of the valve housing, then this causes the fixing disk, the positioning disk, and the pressure pin to lift away from the valve housing counter to the action of the prestressing force exerted by the second spring device. If the arbor is inserted even further into the interior of the valve housing, then the pressure pin comes into contact with the valve cup or the closing element. With further insertion of the arbor into the valve housing, the valve cup is lifted away from its seat, as a result of which, the pressure in the return connected to the second connection is relieved in the direction of the first connection. The inside of the tool catches the pressurized fuel escaping from the first connection.

The above-indicated object is also attained by a set that includes an above-described pressure-holding valve and an above-described tool. If the pressure in the return line is to be reduced, then the connection line attached to the first connection is removed and the arbor is inserted into the first connection until the valve cup lifts away from its seat. The fuel tool catches the fuel that consequently escapes from the first connection.

In a fuel injection system, which includes a low-pressure region and a high-pressure region that supplies a fuel injection valve, which is connected via a return to the low-pressure region, the above-mentioned object is attained in that an above-described pressure-holding valve is connected to the return of the fuel injection valve device and to the low-pressure region.

BRIEF DESCRIPTION OF THE DRAWINGS

Other advantages, features, and details of the present invention ensue from the following description in which various exemplary embodiments are described in detail in conjunction with the drawings, which.

DESCRIPTION OF THE PREFERRED EMBODIMENTS

Figure 1:
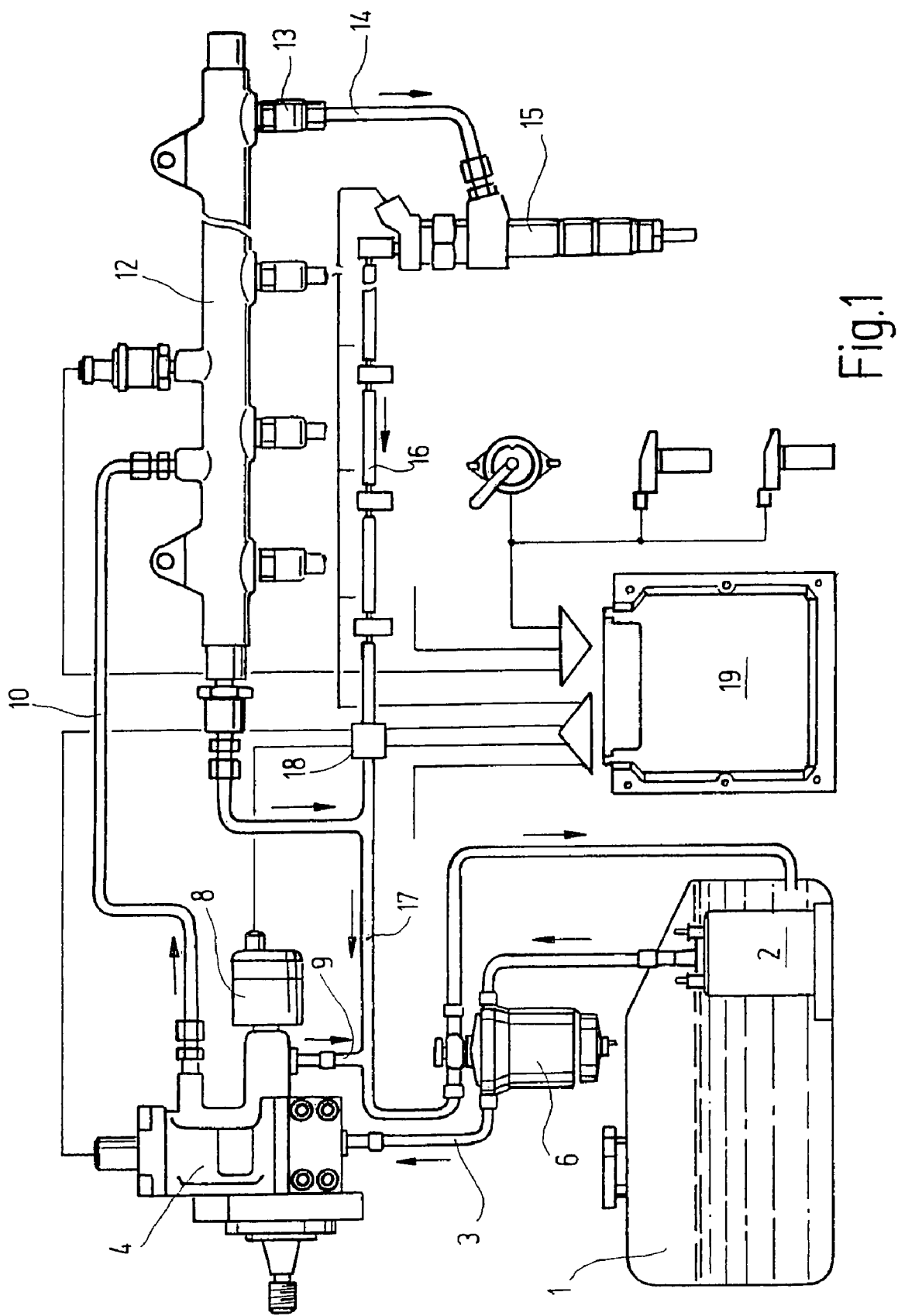
FIG. 1 is a schematic depiction of a fuel injection system equipped with a pressure-holding valve.

FIG. 1 schematically depicts a common rail fuel injection system. From a low-pressure receptacle 1, which can also be referred to as the fuel tank, a fuel-supply pump 2 supplies fuel via a connecting line 3 to a high-pressure pump 4. The connecting line 3 contains an overflow valve 6. The low-pressure receptacle 1, the fuel-supply pump 2 and the connecting line 3 are acted on with low pressure and are thus associated with the low-pressure region.

The high-pressure pump 4 has a pressure control valve 8 attached to it, which is connected via a line 9 to the low-pressure receptacle 1. The high-pressure pump 4 also has a high-pressure line 10 leading from it, which supplies the highly pressurized fuel to a high-pressure reservoir 12, which is also referred to as the common rail. The high-pressure reservoir 12, with the interposition of flow limiters 13, is connected to high-pressure lines 14, which supply the highly pressurized fuel from the high-pressure reservoir 12 to injection valves 15, which are also referred to as injectors and of which only one is shown in FIG. 1 for the sake of clarity. The high-pressure line 10, the high-pressure reservoir 12, the high-pressure line 14, and the injection valve 15 contain highly pressurized fuel and are thus associated with the high-pressure region of the fuel injection system.

From the fuel injection valve 15, a return line, which has two segments 16 and 17, leads to the low-pressure receptacle 1. A pressure-holding valve 18 is connected between the two segments 16 and 17 of the return line. The pressure-holding valve 18 serves to maintain a minimum pressure of approximately 10 bar in the segment 16 of the return line, which permits a coupling chamber between a piezoelectric actuator and a control valve element in the fuel injection valve 15 to be filled regardless of the operating state of the fuel injection system. The design and function of the pressure-holding valve 18 will be explained below. An electronic control unit 19 controls the operation of the fuel injection system.

Figure 2:
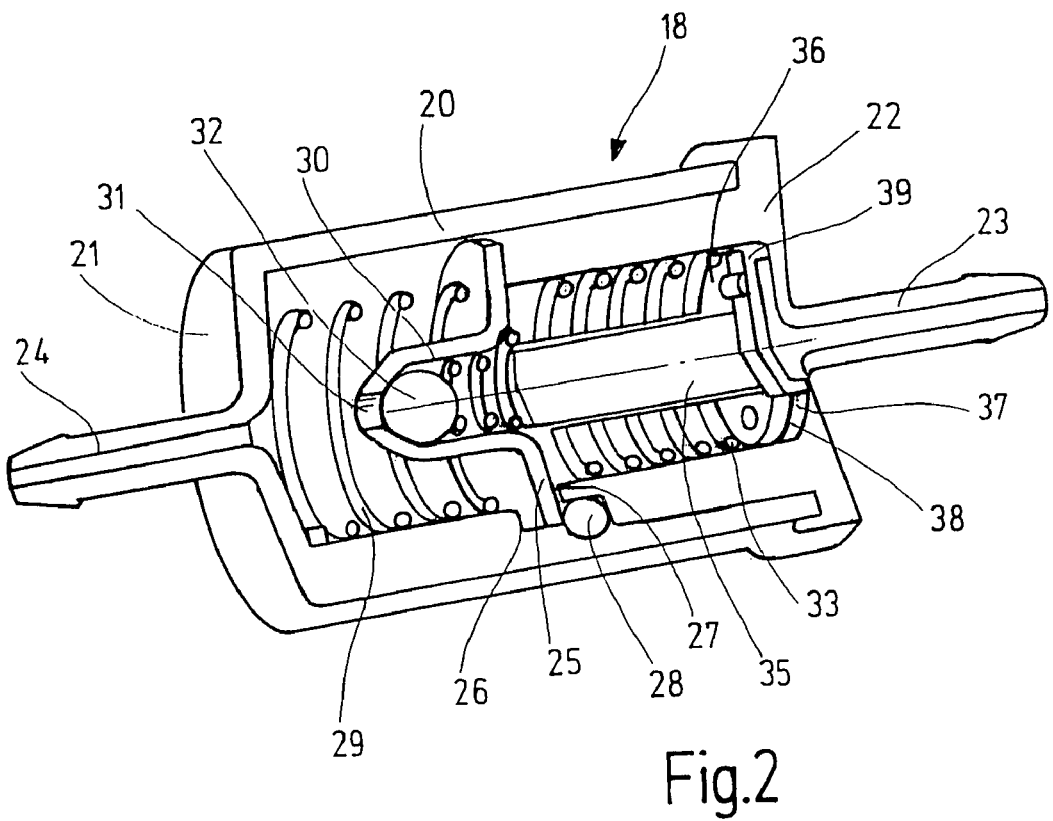
FIG. 2 is a perspective view of a section through a pressure-holding valve equipped with a fixing disk and a positioning disk.

FIG. 2 shows the pressure-holding valve 18 from FIG. 1 in a perspective sectional view. The pressure-holding valve 18 shown in FIG. 2 has a cup-shaped valve housing 20 with a bottom 21 and a cover 22. A first connection fitting 23 extends outward from the cover 22. In addition, a second connection fitting 24 extends outward from the bottom 21. The segment 17 of the return line (shown in FIG. 1) is attached to the first connection fitting 23. The segment 16 of the return line (shown in FIG. 1) is attached to the second connection fitting 24.

The valve housing 20 to 22, which has an essentially circular cylindrical shape, contains a valve cup 25 that can reciprocate between two stops 26 and 27. The stop 26 is embodied on the cup-shaped valve housing part 20 and the stop 27 is embodied on the valve housing cover 22. The valve cup 25 has an essentially circular, disk-shaped base body that rests against an O-ring 28 on its radial outside, which is partially accommodated in a corresponding groove between a tubular shoulder of the housing cover 22 and the valve housing part 20. The disk-shaped base body of the valve cup 25 is held in sealed contact with the O-ring 28 with the aid of a first spring device 29. The first spring device 29 is a prestressed helical compression spring.

The essentially circular, cylindrical base body of the valve cup 25 has a central opening from which a tubular extension 30 leads, which has an opening 31 at its end. The tubular extension 30 contains a valve ball 32 that a second spring device 33 holds in contact with the opening 31 at the end of the tubular extension 30. The second spring device 33 is a prestressed helical compression spring.

The valve ball 32 prestressed by the second spring device 33 unblocks the opening 31 if the pressure in the segment 16 of the return line (see FIG. 1) exceeds a predetermined value. This assures the reduction of any undesirable excess pressure possibly present in the segment 16 of the return line.

One end of a pressure pin 35 is situated close to the valve cup 25 and its other end is integrally connected to a positioning disk 36. The positioning disk 36 cooperates with a filter disk 37 in order to fix a filter sheet 38 in place. The second spring device 33 holds the positioning disk 36, the fixing disk 37, and the interposed fixing sheet 38 against the inside of the valve housing cover 22. On the side of the fixing disk 37 oriented away from the positioning disk 36, an annular bead 39 is provided toward the radial outside, which rests against the inside of the valve housing cover 22. This produces a space between the fixing disk 37 and the valve housing cover 22, which assures that fuel can travel to and from the connection fitting 23.

Figures 3, 4:
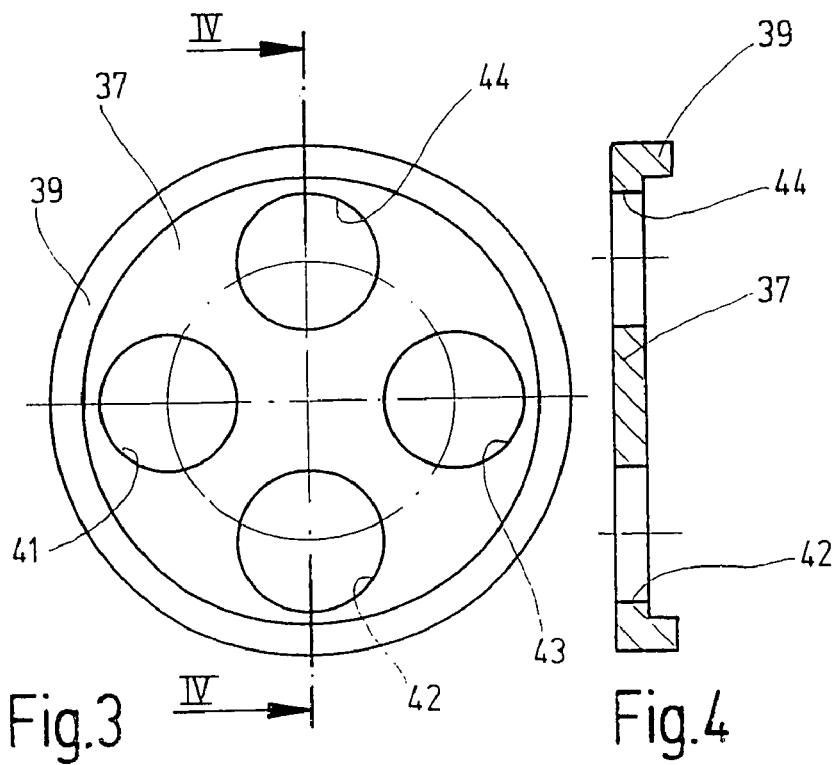
FIG. 3 is a top view of the fixing disk from the pressure-holding valve shown in FIG. 2.
FIG. 4 shows a section along the line IV-IV in FIG. 3.

FIGS. 3 and 4 show that the fixing disk 37 has four through openings 41 to 44 let into it, which assure that fuel can pass through.

Figure 5:
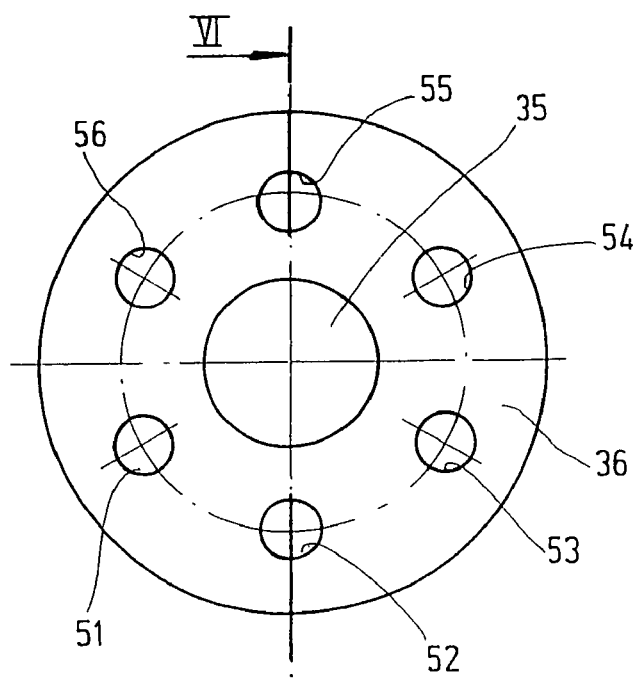
FIG. 5 is a top view of the positioning disk from the pressure-holding valve shown in FIG. 2.
Figure 6:
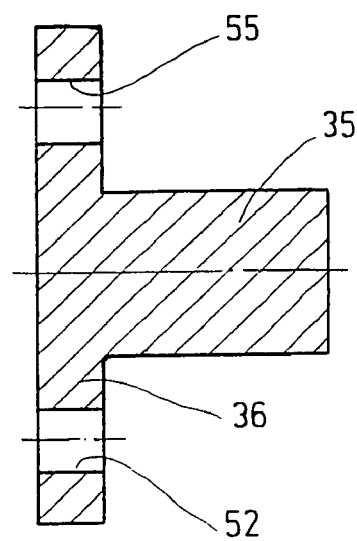
FIG. 6 is a view of a section along the line VI-VI in FIG. 5.

FIGS. 5 and 6 show that six through openings 51 to 56 are let into the positioning disk 36, which likewise assure that fuel can pass through. The through openings 41 to 44 and 51 to 56 in the two disks 37 and 36 are designed and arranged so that regardless of the rotation angle of the two disks in relation to each other, there are always at least two through openings in the two disks at least partially overlapping or congruent to each other. This assures that fuel can always pass through regardless of the installation position of the disks.

Figure 7:
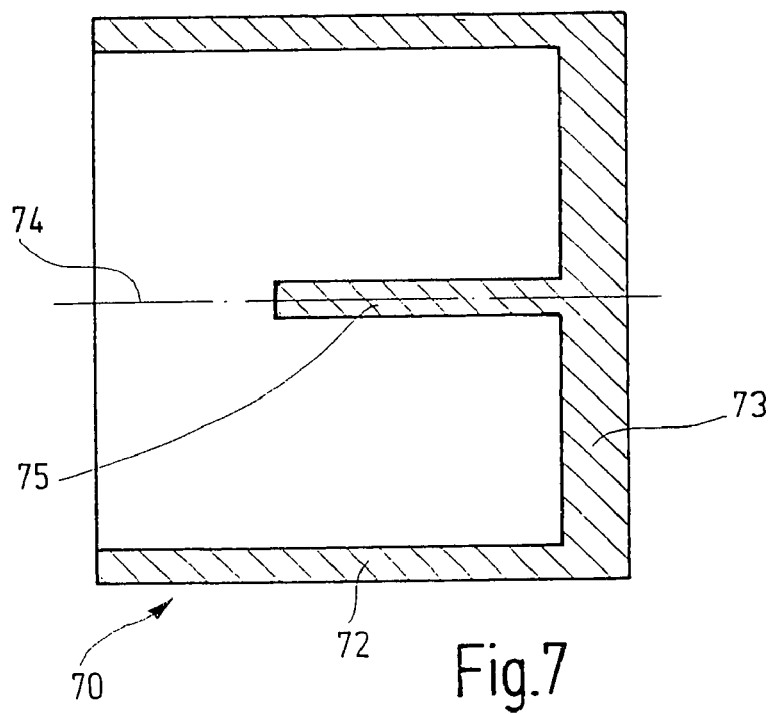
FIG. 7 shows a longitudinal section through a tool for relieving the pressure in the pressure-holding valve shown in FIG. 2.

FIG. 7 shows a longitudinal section through a tool 70, which has an essentially circular, cylindrical base body 72 that is closed at one end by a bottom 73. The tool 70 therefore has a cup-shaped form, with a longitudinal tool axis 74. On the inside of the cup-shaped tool, an arbor 75 extends from the bottom 73 in the direction of the longitudinal tool axis 74. The length of the arbor 75 is less than the overall length of the essentially circular, cylindrical base body 72 in the direction of the longitudinal tool axis 74. The arbor 75 therefore does not protrude out from the tool 70.

When the pressure-holding valve 18 is in the installed position, the segment 16 of the return line (in FIG. 1) is connected to the connection fitting 24 and the segment 17 of the return line (in FIG. 1) is connected to the connection fitting 23. For example, the pressure in the segment 16 of the return line is approximately 10 bar. If it is necessary to reduce this pressure for maintenance and/or installation work, then the segment 17 of the return line, which is acted on by low-pressure or is unpressurized, is removed from the connection fitting 23. Due to the action of the first spring device 29 and the pressure prevailing in the segment 16 of the return line, the valve cup 25 rests against the O-ring 28. In addition, due to the action exerted on it by the second spring device 33, the valve ball 32 rests against the opening 31 of the valve cup 25. The pressure in the segment 16 of the return line and on the inside of the valve housing to which it is connected, between the bottom 21 and the valve cup 25, is maintained even if the first connection fitting 23 is open to the outside.

In order to relieve the pressure in the segment 16 of the return line and the inside of the pressure-holding valve between the bottom 21 and the valve cup 25, the arbor 75 of the tool 70 is inserted into the first connection fitting 23 until the free end of the arbor 75 comes into contact with the fixing disk 37. Then the arbor 75 is inserted further into the valve housing 20, which moves the fixing disk 37, the positioning disk 36, and the pressure pin 35 toward the valve cup 25 until the pressure pin 35 comes into contact with the valve cup 25 or the valve ball 32. If the pressure pin 35 is moved further in the same direction, i.e. toward the second connection fitting 24, then the valve cup 25 lifts away from the O-ring 28 and the fuel contained in the valve housing 20 between the valve cup 25 and the bottom 21 can bypass the valve cup 25 and escape through the first connection fitting 23 into the cup-shaped tool 70. In this state, the circumference edge of the tool 70 oriented away from the bottom 73 is situated in the region of the valve housing cover 22 with enough overlap to reliably prevent an undesired escape of pressurized fuel from the cup-shaped tool 70.

The present invention makes it possible to selectively decrease the pressure in the segment 16 of the return line within seconds, without an uncontrolled spraying of fuel. The function of the pressure-holding valve is maintained. This prevents injuries to service personnel due to uncontrolled spraying of hot fuel when the return rail is opened. It also prevents escaping fuel from coming into contact with hot engine parts or hot exhaust system parts.

The invention claimed is:

1. A pressure-holding valve for a fuel injection system including at least one fuel valve device having a high-pressure region and a low-pressure region, the valve comprising
   a valve housing (20) having a first connection (23) connectable to the low-pressure region and a second connection (24) connectable to the return of a fuel injection valve device,
   a reciprocating valve cup (25) contained in the valve housing,
   a first spring device (29) prestressing the valve cup,
   a through opening (31) in the valve cup,
   means (32) for alternatively opening and closing the through opening;
   a second spring device (33) applying a prestressing force to the means for opening and closing the through opening in order to maintain the through opening normally closed and thus maintain a minimum pressure in the return, and
   a pressure relief device (35,36,37,38) contained in the valve housing between the first connection and the valve cup, the pressure relief device being operable from outside the valve housing so as to provide communication from the second connection to the first connection and thus relieve pressure in the return.

2. The pressure-holding valve according to claim 1, wherein the pressure relief device comprises a pressure pin (35) that protrudes from the first connection toward the valve cup.

3. The pressure-holding valve according to claim 2, wherein the pressure relief device comprises a positioning disk (36) clamped between the second spring device and the valve housing, the pressure pin protruding from the positioning disc.

4. A pressure-holding valve for a fuel injection system including at least one fuel valve device having a high-pressure region and a low-pressure region, the valve comprising
   a valve housing having a first connection connectable to the low-pressure region and a second connection connectable to the return of a fuel injection valve device,
   a reciprocating valve cup contained in the valve housing,
   a first spring device prestressing the valve cup,
   a through opening in the valve cup,
   a closing element operable to close the through opening;
   a second spring device applying a prestressing force to the closing element in order to maintain a minimum pressure in the return, and
   a pressure relief device contained in the valve housing between the first connection and the valve cup, the pressure relief device being operable from outside the valve housing, wherein the pressure relief device comprises a pressure pin that protrudes from the first connection toward the valve cup, wherein the pressure relief device comprises a positioning disk clamped between the second spring device and the valve housing, the pressure pin protruding from the positioning disc, further comprising a fixing disc (37) between the positioning disk and the valve housing, which fixing disc serves to fix a filter element between the positioning disk and the fixing disk.

5. The pressure-holding valve according to claim 4, further comprising through openings (41,42,43,44) in the fixing disk and the positioning disk.

6. The pressure-holding valve according to claim 5, wherein the through openings in the fixing disk and in the positioning disk are designed and arranged to assure a passage of fuel through the fixing disk and through the positioning disk regardless of a relative rotation of the two disks in relation to each other.

7. The pressure-holding valve according to claim 4, wherein the fixing disc comprises an annular bead (39) on its radial outside on the side thereof oriented away from the positioning disk.

8. The pressure-holding valve according to claim 5, wherein the fixing disc comprises an annular bead (39) on its radial outside on the side thereof oriented away from the positioning disk.

9. The pressure-holding valve according to claim 6, wherein the fixing disc comprises an annular bead (39) on its radial outside on the side thereof oriented away from the positioning disk.

10. A tool for reducing the pressure in a pressure-holding valve according to claim 1, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-holding valve in the region of the first connection.

11. A tool for reducing the pressure in a pressure-holding valve according to claim 2, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-holding valve in the region of the first connection.

12. A tool for reducing the pressure in a pressure-holding valve according to claim 3, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-holding valve in the region of the first connection.

13. A tool for reducing the pressure in a pressure-holding valve according to claim 4, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-holding valve in the region of the first connection.

14. A tool for reducing the pressure in a pressure-holding valve according to claim 5, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-bolding valve in the region of the first connection.

15. A tool for reducing the pressure in a pressure-holding valve according to claim 6, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-holding valve in the region of the first connection.

16. A tool for reducing the pressure in a pressure-holding valve according to claim 7, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-holding valve in the region of the first connection.

17. A tool for reducing the pressure in a pressure-holding valve according to claim 8, the tool comprising a cup-shaped base body with a bottom wall and an essentially circular, cylindrical circumferential sidewall extending from the bottom wall, the inner diameter of the sidewall being slightly greater than the diameter of the outer circumference of the pressure-holding valve in the region of the first connection.

18. The tool according to claim 10, further comprising an arbor on the inside of the tool, the arbor extending from the bottom in the direction of the longitudinal tool axis, the arbor having an outer diameter slightly smaller than the inner diameter of the first connection and having a length greater than the length of the first connection.

19. A set including a pressure-holding valve according to claim 1 and a tool comprising a cup-shaped base body with a bottom wall and an essentially circular, cylindrical circumferential sidewall extending from the bottom wall, the inner diameter of the sidewall being slightly greater than the outer circumference of the pressure-holding valve in the region of the first connection.

20. In combination, a fuel injection system including a low-pressure region and a high-pressure region from which a fuel injection valve device is supplied, which fuel injection device is connected to the low-pressure region via a return, and a pressure-holding valve connected to the return of the fuel injection valve device and to the low-pressure region, the pressure holding valve comprising:
　　a valve housing having a first connection connectable to the low-pressure region and a second connection connectable to the return of a fuel injection valve device,
　　a reciprocating valve cup contained in the valve housing,
　　a first spring device prestressing the valve cup,
　　a through opening in the valve cup
　　means for alternatively opening and closing the through opening; and
　　a second spring device applying a prestressing force to the means for opening and closing the through opening in order to maintain the through opening normally closed and thus maintain a minimum pressure in the return, and
　　a pressure relief device contained in the valve housing between the first connection and the valve cup, the pressure relief device being operable from outside the valve housing so as to provide communication from the second connection to the first connection and thus relieve pressure in the return.

* * * * *